United States Patent
Gaudin et al.

(10) Patent No.: US 8,036,070 B2
(45) Date of Patent: Oct. 11, 2011

(54) MAGNETIC RECORDING DEVICE, ESPECIALLY FOR A HARD DISK AND ITS MANUFACTURING PROCESS

(75) Inventors: Gilles Louis Gaudin, Grenoble (FR); Pierre-Jean Zermatten, Grenoble (FR); Ioan Mihai Miron, Echirolles (FR); Alain Schuhl, Grenoble (FR)

(73) Assignee: Centre National de la Recherche Scientifique (FR)

( * ) Notice: Subject to any disclaimer, the term of this patent is extended or adjusted under 35 U.S.C. 154(b) by 346 days.

(21) Appl. No.: 12/267,944

(22) Filed: Nov. 10, 2008

(65) Prior Publication Data
US 2009/0122658 A1 May 14, 2009

Related U.S. Application Data

(60) Provisional application No. 60/987,921, filed on Nov. 14, 2007.

(51) Int. Cl.
*G11B 11/00* (2006.01)
*G11B 5/66* (2006.01)
(52) U.S. Cl. .................. 369/13.38; 428/828.1; 360/131
(58) Field of Classification Search ............... 369/13.17, 369/13.38; 360/131; 428/828.1, 336, 668, 428/829, 830, 212; 427/130
See application file for complete search history.

(56) References Cited

U.S. PATENT DOCUMENTS

| | | | |
|---|---|---|---|
| 6,777,112 B1 | 8/2004 | Girt et al. | |
| 6,830,824 B2 * | 12/2004 | Kikitsu et al. | 428/828.1 |
| 7,678,476 B2 * | 3/2010 | Weller et al. | 428/828.1 |
| 2007/0172705 A1 | 7/2007 | Weller et al. | |

FOREIGN PATENT DOCUMENTS
FR  2 859 306  3/2005

OTHER PUBLICATIONS
International Search Report from French Patent Application No. 0707916, filed Nov. 12, 2007.
Kondo et al.: "Magnetic properties of magnetic dot arrays with a soft magnetic underlayer"; Journal of the Magnetics Society of Japan; vol. 30, No. 2; 2006; pp. 112-115; XP002471711.

* cited by examiner

*Primary Examiner* — Ali Neyzari
(74) *Attorney, Agent, or Firm* — Alston & Bird LLP

(57) ABSTRACT

A magnetic recording device comprising at least one unstructured recording support exhibiting at least one elementary magnetic layer, the recording support having a magnetization perpendicular to the plane of the support characterized in that it comprises magnetic elements having a magnetization perpendicular to the plane of the support and a greater inversion field than the inversion field of the recording support, and which are separated from the recording support by a decoupling layer made of a nonmagnetic material so that the magnetic elements produce a dipolar field in the recording support. The magnetic elements are spaced apart from one another by nonmagnetic regions, each magnetic element defining during a write operation a memory point in the recording support.

13 Claims, 4 Drawing Sheets

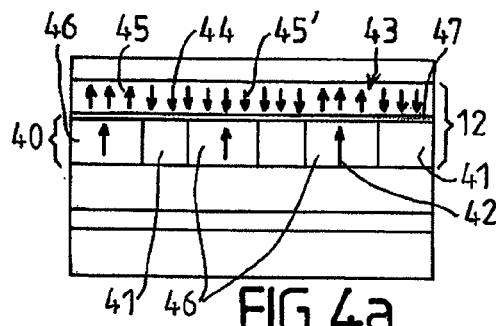
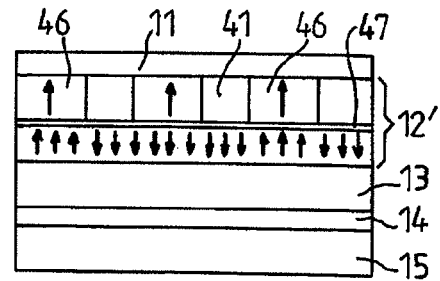
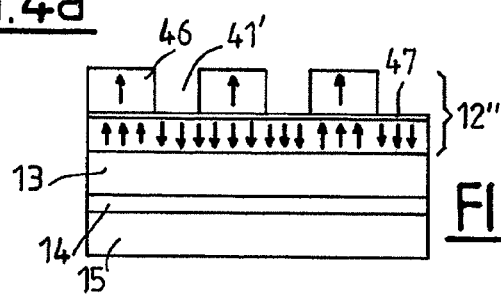
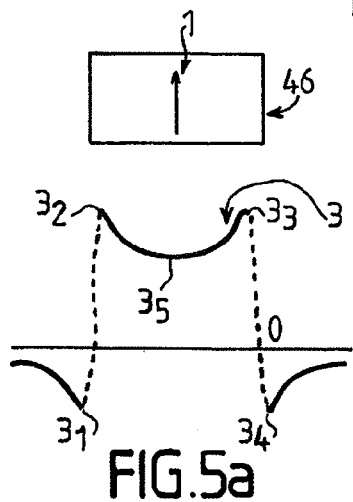
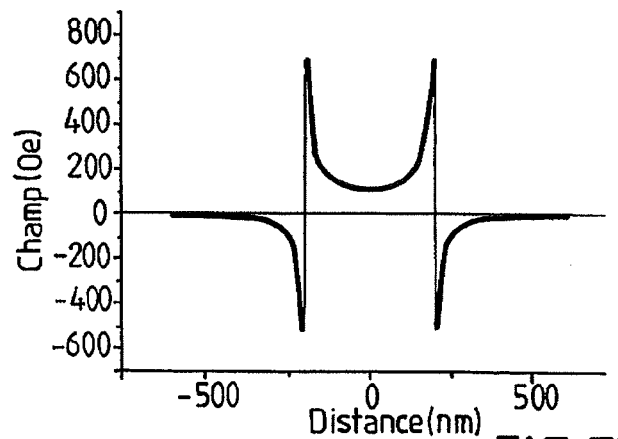
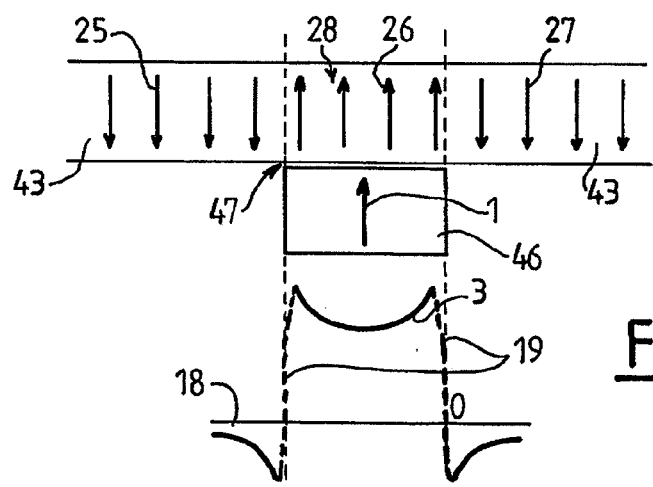

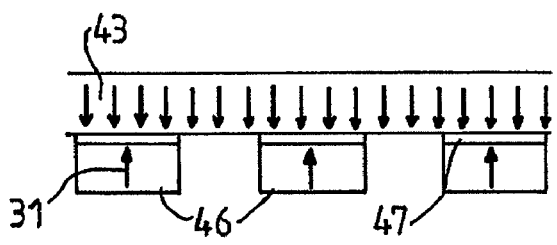 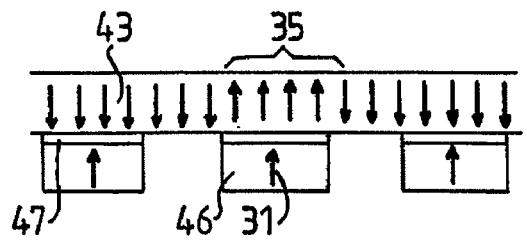
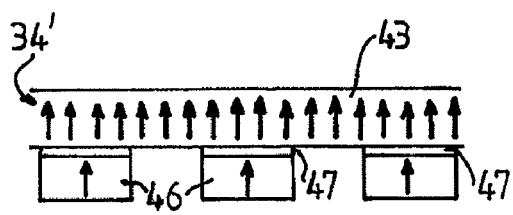 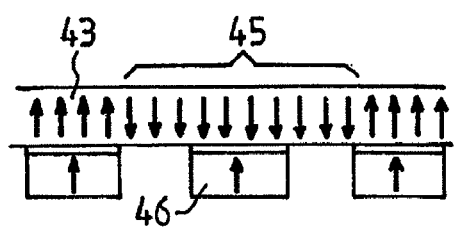
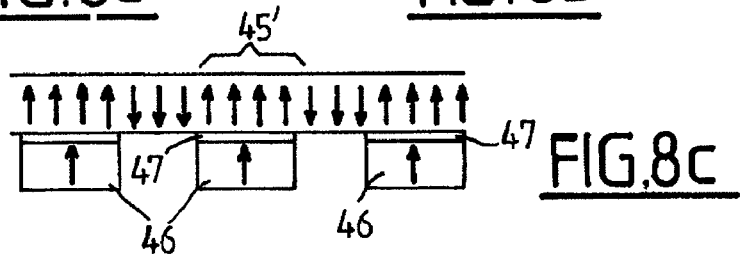
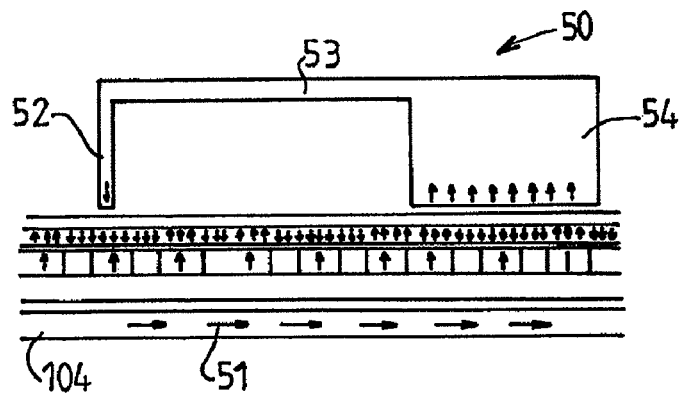
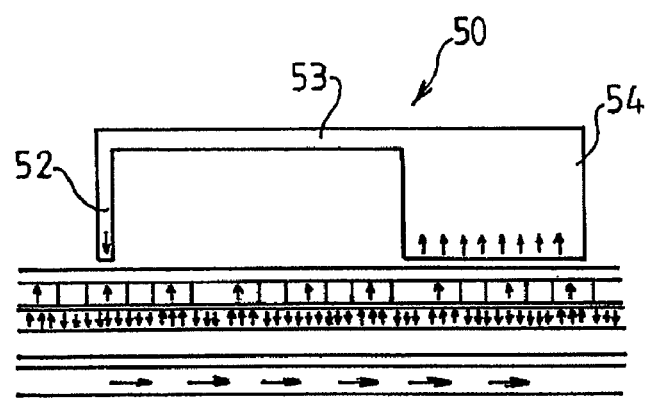

MAGNETIC RECORDING DEVICE, ESPECIALLY FOR A HARD DISK AND ITS MANUFACTURING PROCESS

CROSS REFERENCE TO RELATED APPLICATIONS

This application claims priority from U.S. Provisional Application No. 60/987,921, filed Nov. 14, 2007.

FIELD AND BACKGROUND OF THE INVENTION

The subject of the present invention is a magnetic recording device, in particular for a storage means such as a hard disk and its fabrication process.

Perpendicular magnetic recording for which the memory points are recorded in a medium with off-plane magnetization has been identified as a very promising procedure for increasing storage densities (towards ultra-high storage densities) in computer hard disks. This technology has recently been instituted and marketed by the main industrial players in the sector: Seagate, Hitachi, Toshiba, etc.

Various solutions have been envisaged for solving the problem of superparamagnetic instability and attaining ultra-high storage densities, for example 1 Tbit per square inch, i.e. 0.155 Tbits per $cm^2$, this corresponding to a 25 nm×25 nm memory point.

One of the most promising solutions is the implementation of so-called structured supports or "media" which allow inter alia a physical separation between the memory points.

This solution nevertheless exhibits troublesome limitations, one of the most significant of which is the wide distribution of the inversion fields of the various points, which is due in particular to the step of structuring the magnetic layer.

The main limitation is the presence of a wide distribution of the inversion fields which is observed by numerous groups and was reported on during the last Intermag/MMM conference in 2007. This wide distribution makes it problematic to apply these media to information storage, see in particular "Patterned media for future magnetic data storage", by B. D. Terris, T. Thomson and G. Hu, Microsyst. Tech. 13, pages 189-196 2007.

When a layer is structured into dots, the coercive field of the dots becomes larger than that of the continuous layer and may even be very greatly increased. This has for example been observed in the article "Enhanced Coercivity in Submicrometer-Sized Ultrathin Epitaxial Dots with In-Plane Magnetization" by O Fruchart, J-F. Nozières, W. Wernsdorfer, D. Givord, F. Rousseaux and D. Decanini, Physical Review Letters 82, 1305, 1999.

For Co/Pt multilayers deposited to form a continuous support or medium, the coercive field is 170 Oe although it becomes greater than 1000 Oe when they are deposited to form a medium structured as dots 400 nm by 400 nm, see for example "Magnetic properties of Co/Pt multilayers deposited on silicon dot arrays", by S. Landis, B. Rodmacq and B. Dieny, Physical Review B 6212271 2000. In this configuration, the structured dot represents the memory point itself and a consequence of this structuring may be that the inversion field of these dots may become very large and even sometimes greater than the field at saturation of the write pole pieces rendering the use of these media problematic.

Another difficulty with structured media or supports is the fact that the write/read head no longer sees a smooth continuous medium but a succession of depressions and dots which may impede its flight. This limitation is less significant than that previously presented in the sense that solutions may be devised such as that consisting for example in filling the space between the dots with a nonmagnetic material.

The defects induced by the structuring of the media itself which correspond inter alia to geometric inhomogeneities are very difficult to control especially when the size of the memory points becomes increasingly small when moving towards ultra-high storage densities.

SUMMARY OF THE INVENTION

The basic idea of the invention is to record the information on a recording layer that has not been altered by structuring processes and to control the size of the memory point by structured magnetic elements situated outside the continuous layer, said elements having a magnetization that remains unchanged during the writing of the recording support.

The invention thus relates to a magnetic recording device comprising at least one unstructured recording support exhibiting at least one elementary magnetic layer, said recording support having a magnetization perpendicular to the plane of the support characterized in that it comprises magnetic elements having a magnetization perpendicular to the plane of said support and a greater inversion field than the inversion field of the recording surface, and which are separated from the recording support by a nonmagnetic material decoupling layer, so that the magnetic elements produce a dipolar field in the recording support, the magnetic elements being spaced apart from one another by nonmagnetic regions, each magnetic element defining during a write operation a memory point in the recording surface.

Since the layer on which the information is stored is not structured as dots, its inversion field is not altered by the structuring, and the added magnetic elements confine the magnetic domain within the memory point of the continuous layer because of the dipolar field that they produce. This dipolar field is directly proportional to the magnetization of the magnetic element added, which depends only on their volume which is only slightly influenced by any fabrication defects. Admittedly, fabrication defects are liable to greatly modify the inversion field of the magnetic elements, but it suffices that in all cases it remains greater than the inversion field generated by the write head in the monolayer or multilayer unstructured recording support.

The magnetization produced by the magnetic elements varying little from one element to another, the same holds for the inversion fields induced by the additional dipolar field.

This results, at the level of the recording surface, in the distribution of the inversion fields being very greatly decreased with respect to the known structuring techniques.

The dipolar field generated by the magnetic elements allows to define the memory points without structuring the recording support. The non magnetic decoupling layer avoids an exchange coupling that might produce a duplication of the magnetization of the magnetic elements in the recording support, which allows to modify the information in the recording support while keeping the orientation of the magnetization of the magnetic elements.

Since the magnetic elements have a greater inversion field than the recording support, they keep their magnetization during a writing step.

These characteristics are essentially different from the teaching of US Application US2007/0172705 according to which data are written in a first polycrystalline layer having grains of magnetic material that may be separated by a decoupling material to lower the intergranular exchange coupling and this writing is duplicated in a second layer that is also comprised of grains of magnetic material, and having a stronger intergranular exchange coupling than the grains of the first layer. To that effect, two materials that have different Curie temperatures are provided (the first layer has the higher Curie temperature) and the device is heated above both Curie temperatures and cooled, which implies erasing the layers for each writing operation and a great difficulty of implementation. This technique does not allow a direct writing of a recording support, but necessitates a duplication by exchange on the recording support that has to be devoid of magnetization.

The inversion field of the magnetic elements according to the present invention is at least equal to 1.1 times the inversion field of the recording support to prevent the field of the magnetic elements from reversing during a write. It is advantageously between 2 and 20 times, preferably between 5 and 10 times, the inversion field of the recording support. Any value greater than 20 is also conceivable.

The recording support and/or the magnetic elements can be a continuous layer with perpendicular magnetization comprising one or more elementary layers, in particular an alloy with perpendicular magnetization (for example FePt, FePd, CoPt, TbFeCo, GdCo) or else at least two elementary magnetic layers with perpendicular magnetization (for example Co/Pt, Co/Pd, Fe/Pt, Fe/Pd, Au/Co), or else two elementary layers associating an alternation of a metal and a dielectric (or a semiconductor) for example Co/alumina, Co/Si.

The recording support can also consist of a polycrystalline material.

The magnetic elements and the recording support are advantageously separated by a decoupling layer made of a nonmagnetic material of thickness between 0.5 nm and 15 nm (for example 2 nm).

The nonmagnetic regions which separate the magnetic elements can be simple air spaces between the magnetic elements.

Advantageously, a substantially plane structured layer is formed, comprising the magnetic regions separated by a nonmagnetic filling material.

The assembly consisting of the recording support and the magnetic elements is intended to be disposed in particular on the surface of an information storage means such as a hard disk, and in a first preferred mode the magnetic elements are in contact with the substrate, and in a second mode, the recording support is in contact with said substrate.

The invention also relates to a method of fabricating a device such as defined above. It implements the deposition of one or more elementary layers of magnetic material to form an unstructured recording support and the making of an array of magnetic elements, preferably separated from the recording support by a nonmagnetic material decoupling layer.

According to a first preferred variant, the method is characterized in that the making of the array of magnetic elements or dots is performed before said deposition of one or more elementary layers and implements the deposition of a nonmagnetic material layer.

According to a second variant, the method is characterized in that the making of the array of magnetic elements or dots is performed after said deposition of one or more layers forming the recording support.

To make the array of magnetic elements, the method can implement a structuring to form holes at locations intended to form said magnetic elements, after which at least one layer of a magnetic material is deposited, then a planarization of said layer is performed up to the nonmagnetic material.

To make said array of magnetic elements, the method can implement the deposition of one or more layers of magnetic material which is structured to form said magnetic elements, after which the deposition of a nonmagnetic material layer is performed, followed by its planarization.

BRIEF DESCRIPTION OF THE DRAWINGS

The invention will be better understood on reading the description hereinafter, in conjunction with the drawings in which:

FIGS. 4a to 4c represent three embodiments of a magnetic recording device according to the invention on an information storage means of hard disk type, FIGS. 5a, 5b and 6 illustrate the confinement phenomenon induced in a recording support by a magnetic element according to the invention. These FIGS. 5a and 6 correspond to the case of a square shaped dot, and FIG. 5b to the case of a circular shaped dot 400 nm in diameter, with a spacer of thickness 2 nm in both cases.

FIGS. 7a and 7b, and 8a to 8c illustrate a write operation in case the recording support and the magnetic elements have at the outset magnetizations of opposite senses (FIGS. 7a and 7b) or in the same sense (FIGS. 8a to 8c), FIGS. 9a and 9b illustrate a write operation on a device according to the invention with a known write head, FIGS. 10a to 10g, 10a', 10d' as well as 11a to 11e illustrate two variant methods of fabricating a recording device according to the invention integrated into a hard disk substrate.

MORE DETAILED DESCRIPTION

Figure 1:
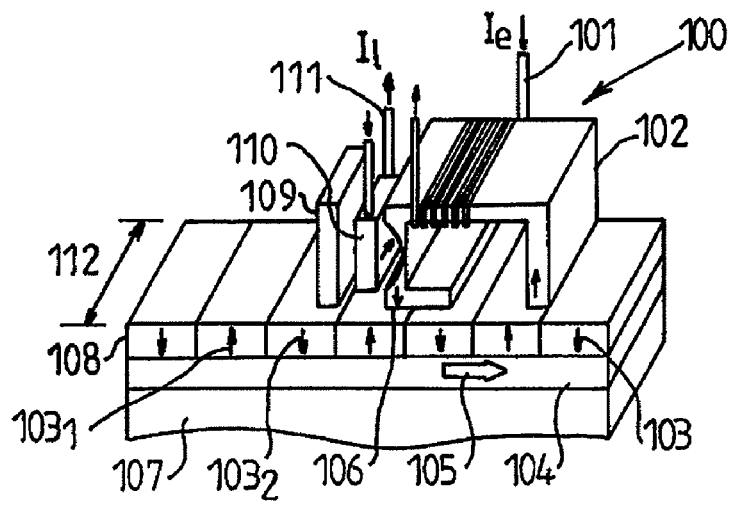
FIG. 1 represents a partial view in section of a hard disk according to the prior art in which the writing zone has perpendicular magnetization and is not structured.

FIG. 1 shows a hard disk of a known type which exhibits a support 107 overlaid with an unstructured layer 108 in which a read/write head 100 writes and reads the information on a track with width 112. It comprises a write head 102 and a read head 110 bordered by a screen 109.

In this figure, $I_e$ denotes the write current through the writing coil 101, which serves to magnetize the write pole 102 and change the sense of the magnetization 103 of the writing layer 108 (perpendicular to the plane of the layer).

For writing, the device comprises the recording layer with perpendicular magnetization 108 (which exhibits one or more elementary layers) in which writing is performed, and preferably the layer 104 of relatively low coercivity, which channels the magnetic field generated by the write pole 102 along its route (depicted by the arrow 105) to the inversion pole 106 of the write head 102. This double-layer system is advantageous since it increases the amplitude of the field felt by the writing layer and ensures that the latter is properly perpendicular to the writing layer.

The writing of an information point takes place by dispatching write current pulses $I_e$ through the winding 101 around the pole piece of the write head 102.

The field generated then inverts the magnetization of the domain to be written between the two orientations, up and down. Reading is done by dispatching a reading current $I_l$ through the reading wires 111 of the reading element 110 and by reading the voltage across the terminals of these wires 111 when the read head 110 passes over upward oriented domains $103_1$ and downward oriented domains $103_2$. The resistance of the reading element 110 depends in fact on the magnetic field to which it is subjected. At present it is constructed of stacks based on metal spin valves or magnetic tunnel junctions.

Figure 2:
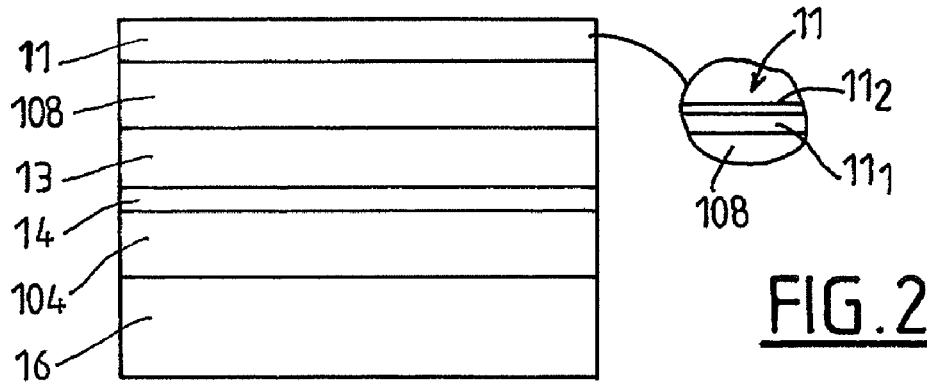
FIG. 2 represents the layer stack diagram for the hard disk of FIG. 1.

The disk exhibits a stack of several layers as represented in FIG. 2. On the substrate proper 16 of the hard disk, that may consist for example of glass, aluminum or an aluminum alloy covered with a layer of NiP or another product, or else silicon, silicon carbide or any other material exhibiting a smooth surface (substrate made of plastic, resin, polycarbonate, etc), are deposited several layers beginning for example with the sublayer 104. The latter consists in general of a soft ferromagnetic material with (low coercivity) but may also consist of other materials such as for example a ferrimagnetic material as proposed by Inamura in Patent Application US 2007/0124749. It may also consist of several elementary layers such as for example two layers of soft ferromagnetic material surrounding a layer of a nonmagnetic material (for example ruthenium, iridium, chromium, etc) which couples these two magnetic layers antiferromagnetically so as to reduce the leakage fields. This type of double-layer is described for example in the Patent Application US 2003/0022023, (Carrey) and in U.S. Pat. No. 6,686,070, (Futamoto). The magnetic layers of this or these sublayer(s) consist in general of amorphous permeable magnetic materials such as the alloys CoNiFe, FeCoB, CoTaZr, etc.

The sublayer 104 has in general a thickness of between 50 and 400 nm.

On this sublayer 104 are thereafter deposited an intermediate layer 14 and the sublayer 13 of the recording layer 108. The aim of the two layers 14 and 13 is both to prevent a coupling by exchange between the sublayer 104 and the recording layer 108 and to promote the growth of the recording layer. The intermediate layer 14 may consist of an amorphous material or a crystalline material of compact hexagonal or face-centered cubic structure: for example an alloy of Ni or of Cu such as NiFe or CuNb.

The sublayer 13 may consist for example of Ru or of an Ru alloy.

The recording layer 108 consists of a magnetic material with perpendicular magnetization such as for example a granular CoPtCr alloy. It may also consist of several magnetic elementary layers with perpendicular magnetization such as for example Co/Pt, Co/Pd, Fe/Pt, etc.

The superlayer 11 which overlies the recording layer 108 consists in general (from down to up in the blowup) of a protective layer 111 applied to the recording layer 108 then of a lubricant layer 112. The protective layer 111 in general consists mainly of carbon, deposited for example by sputtering or chemical vapor phase deposition (CVD) and the lubricating layer 112 of a lubricating liquid for example a perfluoropolyether.

In the known devices with structured media, the recording layer 108 is no longer continuous. It is replaced with a structured layer.

Figure 3:
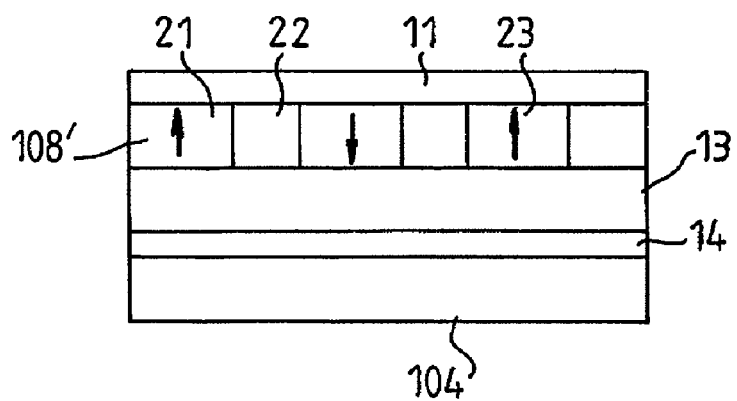
FIG. 3 is a partial section of a stack for a structured magnetic support or medium of the prior art.

FIG. 3 presents an exemplary structured medium. Depicted are the layers 104, 14, 13, and 11 described previously, while the recording layer consists of a structured layer 108' comprising portions of magnetic material 21 with magnetization 23 perpendicular to the plane of the layer 108' and which are separated by nonmagnetic material 22. The portions of magnetic material 21 constitute the memory points, in general of square or circular section, of the structured layer 108'.

According to the invention, recording is carried out by virtue of two superimposed zones or layers, namely an unstructured magnetic support in which the information is stored, and a layer comprising an array of magnetic elements. These two layers are separated by a nonmagnetic layer forming a spacer and whose function is to avoid direct coupling between the magnetic elements and the unstructured magnetic support, so that the magnetic support is subjected to a dipolar field generated by the magnetic elements.

If there were no nonmagnetic spacing layer between the magnetic elements or dots and the recording support, the properties would be totally different, since there would then be a direct coupling (and not a coupling through a dipolar field).

A direct coupling such as this in fact induces a coupling by exchange, which is much greater in energy than the dipolar coupling according to the invention, and a replication of the magnetic configuration of the magnetic elements in the recording support layer. The latter could then no longer play its role since, once the sense and the magnetization of the magnetic elements have been fixed, it is impossible to change the magnetization of the continuous layer neighboring the magnetic element without changing the sense of the magnetization of the magnetic element.

Such a system which is described in "Electric Resistance of Magnetic Domain with NiFe wires with CoSm Pinning Pads" by T. NAGAHAMA and Collaborators (Journal of Applied Physics, 87, p. 5648 et seq.) does not make it possible to make a magnetic recording in a magnetic support.

The assembly of these two layers separated by a spacer forms a recording device that can for example be disposed on a substrate of an information storage means such as a hard disk. Each of these two layers can consist of a stack of elementary layers.

FIGS. 4a to 4c are example stacks comprising the recording device. In the three cases, the recording device 12, 12' and 12" consists of two elements: an unstructured recording support 43 exhibiting one/or more elementary layers and a structured layer 40 comprising nonmagnetic parts 41 or 41' separating magnetic elements or dots 46 whose magnetization, represented by the arrow 42, is perpendicular to the plane of the layer 40 so as to radiate a dipolar magnetic field which traps the domains in the recording support 43 in which the information is written.

In the layer 43, the arrow 44 represents the magnetization (directed downwards) between two information points, and the arrows 45 and 45' the magnetization of an information point oriented upwards (arrows 45) or indeed downwards (arrows 45').

The recording support 43 and the structured layer 40 are separated by a spacer consisting of a nonmagnetic layer 47.

In FIG. 4a, the recording device is denoted 12 and the structured layer 40 is situated under the information support 43 while in FIG. 4b the recording device is denoted 12' and the structured layer 40 is situated above the information support 43. FIG. 4c (recording device 12") is distinguished from FIG. 4b by the fact that the space 41' separating two magnetic elements 46 in the structured layer is empty while the superlayer 11 is omitted.

The function of the nonmagnetic layer 47 is to prevent the direct magnetic coupling by exchange between the two magnetic layers 40 and 43. It can be metallic (for example Cu, Pt, Ru, etc.) or non-metallic (for example an oxide such as $Al_xO_y$, $MgO$, $TiO_2$, etc.). Its thickness is for example between 0.5 nm and 15 nm, in particular between 1 nm and 10 nm, for example substantially equal to 2 nm.

The information is recorded on a magnetic support 43 that has not been altered by a structuring process and the size of the memory point is controlled by the structured magnetic elements which are external to the magnetic recording support. Thus, if the inversion process and therefore the inversion fields are very sensitive to the presence of defects, the latter are in general pointlike or of small spatial expanse. The magnetization of the magnetic elements is therefore little modified by the presence of these defects, if any. This magnetization which is important for the definition of the memory points is therefore substantially the same from one nanostructure to another. This is explained hereinafter in conjunction with FIGS. 5a to 8c.

FIG. 5a represents (label 3) the calculated form of the dipolar field generated by a magnetic element of square section 46 with perpendicular magnetization, vertically in line with this element with a spacer 47 of thickness 2 nm. The reference 1 denotes the direction of the magnetization in the element 46, here perpendicular to the latter and directed upwards. The field 3 exhibits two local maxima, positive $3_2$ and $3_3$ and negative $3_1$ and $3_4$, and a plateau region $3_5$ between $3_2$ and $3_3$.

For the dots of circular shape (FIG. 5b), the shape of the radiated field is little modified.

The shape of this induced field depends little on the size of the magnetic elements 46.

An unstructured layer with perpendicular magnetization is now considered. Initially, the magnetization of this layer is oriented downwards.

To write information, this magnetization is locally inverted upwards. The domain nucleated by the action of the write head then propagates until it attains its equilibrium size. The latter is in general too large to be compatible with ultra-high recording densities. For example the multilayers with perpendicular magnetization $Pt_{1.8nm}/(Co_{0.5nm}/Pt_{1.8nm})_4$, that is to say an elementary layer of 1.8 nm of Pt as buffer layer and the replication of 4 times two elementary layers of 0.5 nm of Co and 1.8 nm of Pt, have equilibrium domains of a size greater than 1 μm (see Magnetic properties of Co/Pt multilayers deposited on silicon dot arrays, S. Landis, B. Rodmacq, B. Dieny, Phys Rev. B 62, 12271-12281 (2000)).

A magnetic element 46 having a magnetization 1 as represented in FIG. 5 is now placed on or under this layer 43, for example under the latter as represented in FIG. 6. This element 46 has a higher inversion field (at least 1.1 times higher) than that of the continuous layer 43, so that its magnetization does not invert during the processes for writing the continuous layer 43. The reference 25 denotes the magnetization of the magnetic layer 43 to the left of the element 46, the reference 26 on the element 46 and the reference 27 to the right of the element 46. Curve 3 illustrates the calculated form of the field radiated by the element 46 vertically in line with the element, the dotted lines 19 bordering the element 46 vertically.

When a domain is inverted locally on the element from downwards upwards, it propagates until it reaches the neighborhood of the vertical of the edges of the element 46, where the field radiated by the element 46 energetically stabilizes the wall of the domain (the upward magnetization 26 is subjected to a positive radiated field while the downward magnetization 25 or 27 to the left and to the right of the vertical of the dot 46 is subjected to a negative radiated field). The domain therefore stops its propagation and the information (the inverted magnetization 26) is confined vertically in line with the element 46 in a domain 28 bordered by the lines 19.

This trapping of the magnetic domain at the moment of writing is due to the field radiated by the element 46 that is to say to the magnetization of this element 46, which it has been seen is not very different from one element 46 to another. Moreover, the continuous (or polycrystalline) magnetic layer 43 is not damaged by structuring. The inversion of the various memory points is therefore reproducible on the whole of the surface of the support since they have very similar inversion fields.

In FIG. 6, the continuous layer 43 has a downward oriented perpendicular initial magnetization. The sense of this magnetization is inverted locally above the element 46 with the aid of a conventional write head. The domain propagates vertically in line with the element 46 but not outside of the domain 28, since it is trapped by the field radiated by this element 46. A write with a reverse field makes it possible to restore the initial state (downward magnetization in the domain 28).

Examples of Writing Processes:

The magnetic elements 46 have their magnetization in the same sense and this sense does not vary in the writing process. It suffices for this purpose for example that these inversion fields of the magnetic elements 46 are stronger than the inversion fields of the layer.

Two Starting Configurations can be Envisaged:

the magnetizations of the unstructured layer 43 and of the elements 46 separated by a nonmagnetic layer 47 are of opposite senses (FIGS. 7a and 7b).

The initial state (FIG. 7a) is one where the layer is magnetized in the converse sense to the magnetic elements 46 which all have a magnetization in the same sense. In FIG. 7b, a memory point 35 has been written above an element 46. An operation for writing a memory point consists in nucleating with a write head a magnetization domain. The latter propagates up to the neighborhood of the vertical of the ends of the dot 46 where the wall needs extra energy to continue to move. The memory point 35 is therefore confined above the magnetic element 46, in a domain of inverted magnetization, vertically in line with the element 46. This domain 35 constitutes the written memory point.

When one wishes to rewrite this memory point, that is to say reverse the magnetization 35 from up to down, a magnetic field is applied with the write head above the element 46 which inverts the magnetization above this element either by nucleation of a domain of magnetization in the sense of the field applied (which in the case of FIG. 7a is directed upwards) followed by its propagation, or more probably for energy reasons by "implosion" of the domain 35. Specifically, the domain situated outside the element 46 has its magnetization in the sense of the magnetic field applied and is energetically favored. It grows and penetrates under the element 46, reducing the size of the domain 35 until it ultimately makes it disappear by "implosion". When writing in this sense, the phenomenon of confinement under the action of the magnetic element 46 does not occur.

2) The magnetizations of the unstructured layer 43 and of the elements 46 separated by a nonmagnetic layer 47 are of the same sense (FIGS. 8a to 8c).

When with a write head, the permuting of the orientation of an inverse magnetization domain vertically in line with the magnetic element 46 is allowed, this domain propagates. It can propagate outside the neighborhood of the vertical of the magnetic element 46 since in this case, the senses of the magnetizations are such that the domain wall is not stabilized by the magnetic element 46. On the other hand, when this domain reaches the neighborhood of the vertical of the neighboring elements 46, the wall is stabilized and the domain ceases propagating as represented in FIG. 8b. The writing domain 45 therefore overhangs the vertical of the dot 46. When one seeks to write this memory point again while changing its sense this time from down to up, a domain is nucleated vertically in line with this same element 46 and this domain propagates until it reaches the neighborhood of the vertical of the element. This in fact leads to the situation described in FIGS. 7a and 7b. The memory point is therefore written (FIG. 8c) in the domain 45' confined to vertically in line with the dot 46. The subsequent writes of this memory point are then similar to the process described in FIGS. 7a and 7b. The magnetic wall is thus stabilized in the neighborhood of the vertical of the ends of the magnetic elements (or dots) and thereafter the situation of FIG. 7b holds.

FIGS. 9a and 9b illustrate the writing process using a perpendicular standard write head on two examples of media according to the invention: on the one hand with the structured layer 40 under the information carrier layer 43 (FIG. 9a) and on the other hand with this structured layer 40 above (FIG. 9b). The write head exhibits a write pole piece 53, a write pole 52, a magnetic field inversion pole 54. As in FIGS. 2, 3 and 4a to 4c, an optional sublayer 104 makes it possible to channel the field towards the inversion pole. The arrows 51 represent the magnetization of this layer in the case where a down domain is written.

The writing of these media is identical to those of the more conventional media and can be done with the same write heads 50 and the same field levels as those commonly used in perpendicular recording. FIG. 9a represents a schematic depiction of the writing of a down domain in the cases where the structured layer 40 is situated under the information carrier layer 43 whereas the case where it is situated above is illustrated in FIG. 9b. The magnetization of the magnetic elements or dots is not affected by the field radiated by the write head (in the case of the figure it remains upwards). The write pole 52 is magnetized downwards by means of a current passing through a winding (not represented here) around the pole piece 53. It generates a magnetic field which closes on the inversion pole preferably via the sublayer 104. The information carrier layer 43 is subjected to this magnetic field and when the latter is greater than the inversion field of the layer 43 (in the writing process), its magnetization inverts and a memory point is written. The inversion pole 54 has much larger dimensions than that of the write pole so that the field is much weaker (the flux $\iint \vec{B} \cdot d\vec{S}$ is preserved) under this pole and the memory points situated below the inversion pole 54 do not invert. This complies with the state of the art of perpendicular recording.

A difference should nevertheless be noted: the field which is exerted on the memory point is the sum of the field radiated by the write pole 52 of the write head (and closed or not by the sublayer 104) and of the field radiated by the magnetic elements 46.

Thus, for example if the field in the magnetic elements 46 is oriented upwards as in FIGS. 9a and 9b, the field necessary for inverting the magnetization of the memory point from down to up is equal to $H_r-H_s$ while that necessary for inverting from up to down is equal to $-H_r-H_s$, where $H_r$ is the positive field to be applied in order to invert the magnetization of the memory point (in this example it has been considered that this field for inverting from down to up and from up to down was the same, this generally being the case); and $H_s$ is the positive field radiated by the upward magnetization elements on the dot.

It may also be noted that the recording device according to the invention (recording support 43 and magnetic elements 46) can also be used as needed in a stack with no sublayer 104. In this case, the stack is simpler. For example, the recording device (recording support 43 and layer 40) can be deposited directly on a hard disk substrate (in the same materials as described previously). Writing of the support 43 can then be done as indicated previously.

In all cases, reading is done in the same manner as for the reading of perpendicular media, namely by means of a magnetoresistive element, based on a metal spin valve or, at present, a magnetic tunnel junction.

The head reads the memory point depending on whether the magnetization is directed upwards or downwards. In the case of the invention, the field radiated by the memory point is supplemented with that generated by the magnetic elements 46. But as the latter retain their magnetization unchanged and since on the other hand the height of the read head with respect to this structure does not vary, the field radiated by the elements 46 and which is added to that radiated by the memory point acts only as a constant shift that it suffices to know (for example by measuring it beforehand or by calculating it).

The process of fabricating the device according to the invention implements techniques known to the person skilled in the art.

The implementation of a structural layer allows to obtain magnetic elements having a defined shape and separated by non magnetic parts 41 or 41'.

The structured layer is preferably amorphous or crystalline. In the case it is polycrystalline, each magnetic element is preferably comprised of several grains of magnetic material.

Depending on whether the structured layer is placed above or below the information carrier layer, two examples of fabrication are given in FIGS. 10a and 10b.

Ultra-high recording densities correspond to 1 Tbit/inch$^2$ and beyond. 1 Tbit/inch$^2$ implies dimensions of 25 nm×25 nm i.e. for example a 20 nm×20 nm memory point separated from its neighbor by 5 nm.

The width of the non magnetic parts 41 or 41' may be in practice chosen between 2 nm and 20 nm. This width is preferably chosen to avoid exchange coupling between adjacent magnetic elements.

The structuring on this scale of the structured layer 40 can presently be obtained by electronic lithography or nanoprinting followed by etching for example by a reactive dry etching step.

Figure 10A:
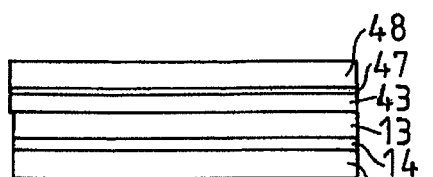
Figure 10B:
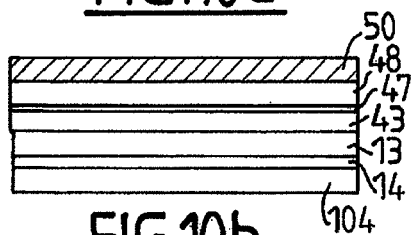
Figure 10C:
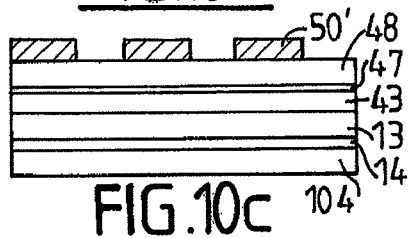
Figure 10D:
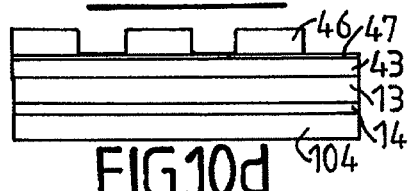
Figure 10E:
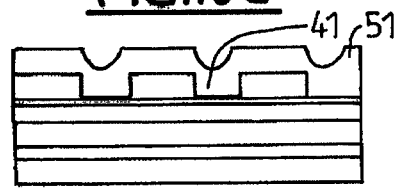
Figure 10F:
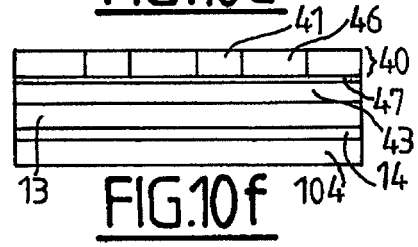
Figure 10G:
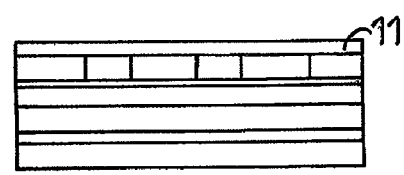

FIGS. 10a to 10g correspond to the case where the structured layer 40 exhibiting magnetic dots 46 is situated above the information carrier layer 43. In the first case, the stack is made, for example by deposition by sputtering, on the substrate 16 of the hard disk not represented here (cf. FIG. 2): namely successively a "magnetically soft" sublayer 104; the intermediate layer 14; an optional sublayer 13 to the recording layer; the information support layer 43; optionally the nonmagnetic separating layer 47 then ultimately a magnetic layer 48 which will be structured as dots 46. The layers 43 and 48 are from a material with perpendicular magnetization which can be deposited by any known method (sputtering, evaporation, electrochemical deposition etc.) The first step consists in structuring the magnetic layer. This operation can be carried out for example by spreading photosensitive or electrosensitive resin 50 that is exposed in order to structure it or else by depositing a polymer or a resin 50 (FIG. 10b) that is structured by a nanoprinting method. The result 50' of the structuring is represented in FIG. 10c. This pattern is thereafter transferred into the magnetic layer 46 by etching, for example by ion beam dry etching, or by reactive dry etching (FIG. 10d). This structure is thereafter covered with a nonmagnetic material 51, for example SiO$_2$ or another dielectric or else a nonmagnetic metal (FIG. 10e). A planarization step, for example using a chemical-mechanical planarization method well known in the electronics industry makes it possible to obtain a structured layer 40 (FIG. 10f) exhibiting an array of magnetic dots 46 separated by nonmagnetic material 41 and on which the superlayer 11 can ultimately be deposited (FIG. 10g).

A variant represented in FIGS. 10a' and 10d' consists in depositing the stack as far as the intermediate layer 47. The magnetic structure (FIG. 10d') is then no longer obtained by etching but directly by deposition, for example by a so-called "lift-off" method using an exposed resin or a polymer followed by nanoprinting. The rest of the method is identical.

In the preferred variant (FIGS. 11a to 11e) where the structured layer 40 is situated below the information support layer 43, an implementation can be to deposit the layers 104, 14 and 13 on the substrate 16 of the hard disk (not represented) as in the previous case.

Figure 11A:
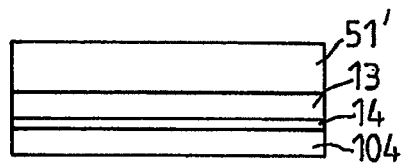
Figure 11B:
Figure 11C:
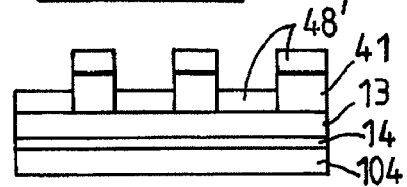
Figure 11D:
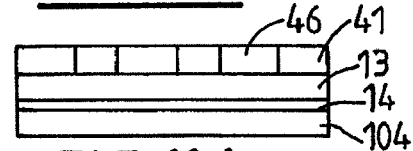
Figure 11E:
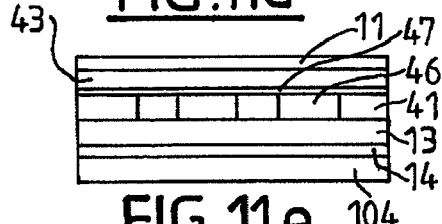
Figure 10A:
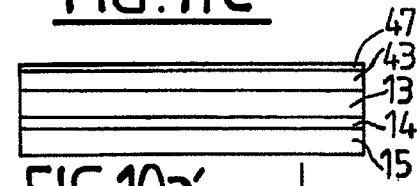
Figure 10D:
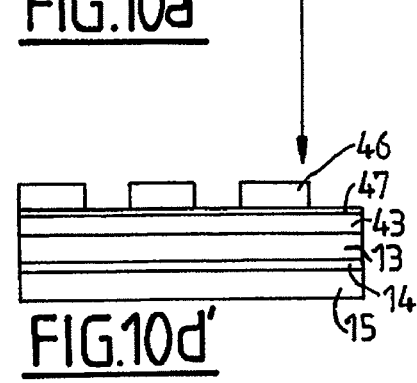

A nonmagnetic layer 51' is then deposited (FIG. 11a). It is then structured (FIG. 11b) to produce holes at the location of the dots 46 and to form the preserved nonmagnetic material 41, by the same techniques as those which made it possible to obtain FIGS. 10c and 10d. The magnetic material 48' is then deposited on this structure (FIG. 11c). A planarization step, identical to that described previously, makes it possible to obtain the structured layer 40 consisting of an array of magnetic dots 46 separated by the nonmagnetic regions 41 (FIG. 11d). The information support layers 43 and the optional superlayer 11 can thereafter be deposited on the layer 40.

It will be understood that for each of the two variants, the magnetic dots can equally well be made by direct structuring of the dots or else by structuring a nonmagnetic layer to produce holes at the future location of the dots.

It is also possible to carry out an organized deposition of organized magnetic nanostructures by a physical and/or chemical procedure for example according to the technique described in "Nanofabricated and self-assembled magnetic structures as data storage media" by B. D. Terris and T. Thompson, J. Phys. D: Applied Physics 38 (2005) p. 199 to 222. This deposition can be followed by the deposition of a layer 51 of nonmagnetic material followed by its planarization.

The recording device consists of two "layers" with different functions: on the one hand, a recording support exhibiting one or more elementary layers, which carries the information and preferably has sufficient anisotropy to retain the information over a duration of for example ten years (faced with thermal fluctuations) without the inversion field of a point being too large, and on the other hand magnetic elements which are distributed in a structured layer and which produce the field which confines the domains defining the memory points.

Depending on the inversion fields of the information carrier layer 43 and the field that one wishes to deliver with the write head, the constituent element or elements of the dots 46 can be adjusted so as, for example, to optimize the value of the magnetization at saturation.

Specifically, the materials constituting the recording layer 43 and the materials constituting the dots 46, just like the thickness of the recording layer 43 and dots 46, can be totally different and therefore be optimized independently. The layer 43 and the dots 46 are in fact coupled only by the dipolar field produced by the dots 46 which serves for the confinement of the memory points.

Another significant point is that the conventional technologies without structuring use polycrystalline media whose grains are decoupled, an information point occupying some hundred grains. In the case of the structured media in general and of the invention in particular, this layer need no longer be polycrystalline, since the separation between the memory points is physical and is given by the structuring of the dots 46 situated outside of the layer 43. It is therefore possible to take continuous layers, exhibiting one or more continuous elementary layers.

EXAMPLES

The layer 43 and the dots 46 are formed of a stack of Co/Pt bilayers, the number of repetitions of which has been chosen so as to obtain inversion fields for the dots that are greater than that of the continuous storage layer.

The dots 46 of the structured layer are composed of four successive stacks of an elementary bilayer comprising an elementary layer of 0.6 nm of Co and an elementary layer of 1.8 nm of Pt (i.e. eight layers in all). The separating layer 47 is platinum whose thickness is chosen to optimize the field produced in the layer 43 by the elements 46, for example 2 nm.

If the continuous layer consists, like the dots of a stack of an elementary bilayer of 0.6 nm of Co and of 1.8 nm of Pt repeated four times, the inversion field of the layer 43 is 0.06 T, and that of the dots is at least equal to 0.4 T, that is to say the inversion field of the dots 46 is at least equal to 7 times the inversion field of the layer 43. It is noted indeed that structuring into dots greatly increases the inversion field with respect to a continuous layer and the value of this inversion field increases all the more the smaller the dots.

For dots 46 of 200 nm, and a separating layer 47 made of Pt with a thickness of 2 nm, the dipolar field radiated on the continuous layer 43 which adjoins the dot has a maximum value of 0.05 T ($3_2$ and $3_3$ in FIG. 5a) and in the plateau region $3_5$ a value substantially equal to 0.015 T. The value of this dipolar field can be adjusted by modifying the thickness of the separating layer 47. The more this thickness increases, the lower the dipolar field radiated on the continuous layer 43.

The layers 43 and/or the dots 46 can consist of any multilayer with perpendicular magnetization such as for example: CoPt, Co/Pd; Fe/Pt; Fe/Pd, Au/Co; etc.

The layer 43 and/or the dots 46 may also consist of multilayers alternating between elementary layers made of metal and of dielectric or of semiconductors, for example multilayers based on Co/Alumina; Co/Silicon etc.

The layer 43 and/or the dots 46 may also consist of perpendicular magnetization alloys such as the alloys FePt, FePd, CoPt, etc., or else of alloys which, like TbFeCo and GdCo etc., include transition metals and rare earths.

To ensure same sense magnetization of the recording support (43) and of the magnetic elements (46), it is possible to subject the device to a strong magnetic field greater than the inversion field of the magnetic elements 46. If the recording support 43 is desired to have a reverse orientation to that of the magnetic elements 46, it suffices to subject the device to a magnetic field whose intensity is greater than the inversion field of the recording support 43, but lower than the inversion field of the magnetic elements 46.

The invention claimed is:

1. A magnetic recording device comprising at least one unstructured recording support exhibiting at least one elementary magnetic layer, said recording support having a magnetization perpendicular to the plane of said support, said recording device comprising magnetic elements having a magnetization perpendicular to the plane of said support and a greater inversion field than the inversion field of the recording support, and which are separated from the recording support by a decoupling layer made of a nonmagnetic material so that the magnetic elements produce only a dipolar field in the recording support without a magnetic coupling by exchange, the magnetic elements being spaced apart from one another by nonmagnetic regions, each magnetic element defining during a write operation a memory point in the recording support.

2. A device according to claim 1, wherein the inversion field of the magnetic elements is between 1.1 and 20 times the inversion field of the recording support.

3. A device according to claim 1, wherein the recording support and/or the magnetic elements comprise several elementary layers.

4. A device according to claim 1, wherein the recording support is made of an alloy selected from FePt, FePd, CoPt, TbFeCo, and GdCo.

5. A device according to claim 3, wherein the recording support comprises at least one elementary magnetic bilayer selected from Co/Pt, Co/Pd, Fe/Pt, Fe/Pd, and Au/Co.

6. A device according to claim 3, wherein the recording support comprises at least two elementary layers associating a metal and a dielectric or a semiconductor.

7. A device according to claim 1, wherein the recording support is made of a polycrystalline material.

8. A device according to claim 1, wherein the nonmagnetic material decoupling layer has a thickness of between 0.5 and 15 nm.

9. A device according to claim 1, wherein the nonmagnetic regions are air spaces between the magnetic elements.

10. A device according to claim 1, wherein the nonmagnetic regions are made of a nonmagnetic solid material so as to form with the magnetic elements a substantially plane layer.

11. A device according to claim 1, wherein the assembly consisting of the recording support and the magnetic elements is disposed on the surface of a substrate of an information storage means.

12. A device according to claim 11, wherein the magnetic elements are in contact with the surface of the storage means substrate.

13. A device according to claim 11, wherein the recording support is in contact with said surface of the storage means substrate.

* * * * *